(12) United States Patent
Ichishima

(10) Patent No.: US 8,353,659 B2
(45) Date of Patent: Jan. 15, 2013

(54) FASTENING METHOD FOR A FASTENING BOLT OF A SUB FRAME TO CAR BODY AND A SUB FRAME RIGID COLLAR FOR CAR USED FOR THE FASTENING METHOD

(76) Inventor: Tatsuru Ichishima, Tokyo (JP)

( * ) Notice: Subject to any disclaimer, the term of this patent is extended or adjusted under 35 U.S.C. 154(b) by 0 days.

(21) Appl. No.: 12/908,654

(22) Filed: Oct. 20, 2010

(65) Prior Publication Data

US 2011/0097176 A1  Apr. 28, 2011

Related U.S. Application Data

(63) Continuation of application No. PCT/JP2009/069757, filed on Nov. 24, 2009.

(30) Foreign Application Priority Data

Oct. 22, 2009  (JP) .................................. 2009-243802

(51) Int. Cl.
*F16B 43/00*  (2006.01)

(52) U.S. Cl. ........ 411/531; 411/538; 411/541; 411/546; 411/918

(58) Field of Classification Search .................. 411/339, 411/367, 388, 389, 424, 426, 458, 460, 531, 411/538, 541, 546, 918; 16/2.1–2.5
See application file for complete search history.

(56) References Cited

U.S. PATENT DOCUMENTS

| 157,618 A * | 12/1874 | Mantey ............................. 16/2.4 |
| 241,626 A * | 5/1881 | Davenport ...................... 278/100 |
| 1,356,404 A * | 10/1920 | Robinson ........................ 411/546 |
| 2,115,495 A * | 4/1938 | Mapelsden .................. 174/70 R |
| 2,357,370 A * | 9/1944 | Wilfert .......................... 280/788 |
| 3,033,624 A * | 5/1962 | Biesecker ...................... 384/125 |
| 3,236,549 A * | 2/1966 | Phinney ........................ 403/162 |
| 3,829,184 A * | 8/1974 | Chevret ........................ 384/280 |
| 7,121,780 B2 * | 10/2006 | Matich et al. ................. 411/367 |

FOREIGN PATENT DOCUMENTS

| JP | 2005-090530 | 4/2005 |
| JP | 3733534 | 1/2006 |

\* cited by examiner

*Primary Examiner* — Roberta Delisle
(74) *Attorney, Agent, or Firm* — Jordan and Hamburg LLP

(57) ABSTRACT

The fastening is performed by using the fastening bolt of the conventional mass-produced car, the fastening method capable of obtaining "Resonance frequency" of the aimed body and the sub frame rigid collar for car used for the fastening method, are provided by the tightening work with the conventional specified torque, and only by simple work of interposing the sub frame rigid collar for car, without need the work of any special processing.

2 Claims, 9 Drawing Sheets

FASTENING METHOD FOR A FASTENING BOLT OF A SUB FRAME TO CAR BODY AND A SUB FRAME RIGID COLLAR FOR CAR USED FOR THE FASTENING METHOD

REFERENCE TO RELATED APPLICATION

This is a continuation application of PCT/JP2009/69757 filed Nov. 24, 2009.

BACKGROUND OF THE INVENTION

The present invention relates to a fastening method for a fastening bolt of a sub frame to car body and a sub frame rigid collar for car used for the fastening method.

The mass-produced four wheel car in the conventional car puts a power system and a drive system on a sub frame and is assembled to a monocoque chassis (body).

In this case, the body and the sub frame are fastened by a bolt, and in order to improve the work efficiency, a clearance (gap) is provided to a hole extended through the sub frame and a hole of the screw at the body side.

That is, an example thereof is shown in FIG. 14.

An introduction hole 3 to a screw hole 2 of a fastening bolt 10 of a monocoque body 1, and a through-hole 5 of the fastening bolt 10 of a sub frame 4, are provided with the introduction hole 3 having 16 mm diameter larger than the outer diameter of the fastening bolt 10 of for example, 14 mm and the through-holes 5 having diameter larger than therefrom.

This clearance exists commonly from a light duty vehicle to a passenger car, a sports car, and a high-level large-scale vehicle in a mass production vehicle all over the world.

Recently, the stiffness in the body unit has risen rapidly. However, no matter how the body unit is very high stiffness, the generation of "shaking" heterogeneous phase is undeniable by the existence of the clearance concerning the fastening condition with the sub frame, this influences the decrease in the resonant frequency of the body, so that it is a big problem and is an encumbrance that negatively affects the control performance, in particular, handling, riding comfort, quietness, and the collision safety.

As the means to resolve the problem of such clearance, it is developed and proposed the method of interposing a bush.

For example, in JP 2005-90530, A (patent document 1), the invention of "Locking fastening structure of plural stacking members" is disclosed.

As shown in FIG. 15, the thin wall portion of an inverted cone body having an eccentric through-hole 59 larger than the nominal diameter of the bolt 52 a little, is involved to a bush 58 which provides in file a segmental slit 51, and is provided with an inverted cone hole 51 having the taper plane of the same inclined angle as the inverted cone inclined angle of the bush 58 is punched onto the upper portion of the bolt through-hole 56 from the plane of the fastened member 54 at the side where a bolt head 52a abuts thereto, thereby fastening the fastened member 54 in the conditions of interposing the bush 58.

The technology similar thereto is disclosed in JP 3733534 as "Locking fastener" (patent document 2).

SUMMARY OF THE INVENTION

The problem to be resolved is a resolution of the problem based on the existence of the clearance in the fastening method according to the fastening bolt of the sub frame to the aforementioned car body, in order to apply to the fastening structure due to the patent documents 1 and 2, in addition to the problem in working of demanding the manufacturing that punches a inverted conic hole portion having the taper plane for interposing the bush, depending on this structure, the improvement of "resonance frequency" and improvement of "property of the resonance frequency" in the aimed car body cannot be carried.

Therefore, the present invention has for its object to provide a fastening method by the use of a fastening bolt of the sub frame capable of resolving these problems, and a sub frame rigid collar for car being used thereto.

In order to achieve this object, the present fastening method capable of obtaining "Improvement of the resonance frequency" and "Improved property of the resonance frequency" of the aimed car body, may be obtained by using means for fastening the mass-produced car with the conventional fastening bolt, only by simple work of interposing the sub frame rigid collar for car, and by the tightening work with the conventional specified torque, without need the work of any special processing.

According to the present invention, there is provided a method of fastening a fastening bolt of a sub frame for a car body, in which a screw hole of the fastening bolt of the car body is provided with an introduction hole of the fastening bolt, the sub frame is provided with a through-hole of the fastening bolt, and the introduction hole and the through-hole are provided with a clearance for inserting the fastening bolt, respectively, characterized in that a cylindrical portion of a collar body is provided with a through-hole of the fastening bolt having a larger diameter than an outer diameter of the fastening bolt, a collar is provided to the outer periphery of the cylindrical portion of the collar body, progressively, an upper outer peripheral portion of the cylindrical portion is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, a bottom outer peripheral portion of the cylindrical portion is provided with a bottom peripheral edge portion having the outer diameter smaller than the inner diameter of the introduction hole of the sub frame, and a tapered outer peripheral portion at the sub frame having the outer diameter portion, of which the diameter gradually grows from the bottom peripheral edge portion toward the collar root tip peripheral edge portion of the cylindrical portion, and whose outer diameter of the center section of the peripheral edge portion is larger than the inner diameter of the through-hole of the sub frame, after the sub frame rigid collar for car integrally formed with a metal having the plasticity such as aluminum or the thermal refining material equal therewith, is inserted from the treaded portion side of the bolt through the fastening bolt through-hole of the said sub frame rigid collar for car, and interposed between the car body and the sub frame, the fastening bolt is fastened by a necessary torque while screwing the treaded portion of the fastening bolt in the screw hole of the car body, the tapered outer peripheral portion at the body side of the sub frame rigid collar for car and the tapered outer peripheral portion at the sub frame side are fastened by compressing and force-fitting the outer diameter portions having its diameter larger than the inner diameters of the introduction hole and the through-hole of both tapered outer peripheral portions into respective introduction hole of the car body and through-hole of the sub frame while deforming the outer diameter portions of the car body and the sub frame with the plasticity of the sub frame rigid collar for car, thereby press-attaching and press-fitting the outer diameter portions between the inner peripheral surface of the introduction hole of the car body and the through hole of the sub frame and the outer peripheral surface of the fastening bolt, and by intervening and press-attaching the collar between the surface of portal edge portions of the introduction hole of the car body and of the through-hole of the sub frame.

According to the present invention, there is provided a method of fastening a fastening bolt of a sub frame for a car body, in which a screw hole of the fastening bolt of the car body is provided with an introduction hole of the fastening bolt, the sub frame is provided with a through-hole of the fastening bolt, and the introduction hole and the through-hole are provided with a clearance for inserting the fastening bolt, respectively, characterized in that a cylindrical portion of a collar body is provided with a introduction hole of the fastening bolt having an inner diameter larger than an outer diameter of the fastening bolt, a collar is provided to the bottom outer periphery of the cylindrical portion, progressively, an outer peripheral portion of the cylindrical portion is provided with an upper peripheral edge portion having the outer diameter smaller than the inner diameter of the through-hole of the sub frame, and a tapered outer peripheral portion having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the through-hole of the sub frame, the sub frame rigid collar for second car formed with a metal having the plasticity such as aluminum or a thermal refining material equal thereto, integrally is inserted from the treaded portion side of the bolt through the fastening bolt through-hole of the said sub frame rigid collar for car, and is interposed between the fastening bolt and the sub frame, a cylindrical portion of a collar body is provided with a through-hole of the fastening bolt having a larger diameter than an outer diameter of the fastening bolt, a collar is positioned at the center section of the collar body and provided to the outer periphery of the cylindrical portion, progressively, an upper outer peripheral portion of the cylindrical portion is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, a bottom outer peripheral portion of the cylindrical portion is provided with a bottom peripheral edge portion having the outer diameter smaller than the inner diameter of the through-hole of the sub frame, and a tapered outer peripheral portion at the sub frame side having the outer diameter portion, of which the diameter gradually grows from the bottom peripheral edge portion toward the collar root tip peripheral edge portion of the cylindrical portion, and whose outer diameter of the center section of the outer peripheral edge portion is larger than the inner diameter of the through-hole of the sub frame, after the sub frame rigid collar for first car integrally formed with a metal having the plasticity such as aluminum or the thermal refining material equal thereto, is inserted from the treaded portion side of the bolt through the fastening bolt through-hole of the sub frame rigid collar for car, and is interposed between the car body and the sub frame, the fastening bolt is fastened by a necessary torque while screwing the treaded portion of the fastening bolt in the screw hole of the car body, the tapered outer peripheral portion of the sub frame rigid collar for second car is fastened into the through-hole of the sub frame, and the tapered outer peripheral portion at the body side of the sub frame rigid collar for car of the sub frame rigid collar for first car and the tapered outer peripheral portion at the sub frame side, are fastened into respective introduction hole of the car body and through-hole of the sub frame, by compressing and force-fitting the outer diameter portions having its diameter larger than the inner diameters of the introduction hole and the through hole of respective tapered outer peripheral portions in respective introduction hole of the car body and through-hole of the sub frame while deforming the outer diameter portions of the car body and the sub frame with the plasticity of the sub frame rigid collar for first and second cars, thereby press-attaching and press-fitting the outer diameter portions between the inner peripheral surface of the introduction hole of the car body and the through hole of the sub frame and the outer peripheral surface of the fastening bolt, by intervening and press-attaching the collar of the sub frame rigid collar for second car between the surface of portal edge portions of the through-hole of the sub frame, and by intervening and press-attaching the collar of the sub frame rigid collar for first car between the surface of portal edge portions of the introduction hole of the car body and of the through-hole of the sub frame.

According to the present invention, there is provided a cylindrical portion of a collar body is provided with a through-hole of the fastening bolt having a larger diameter than an outer diameter of the fastening bolt, a collar is provided to the outer periphery of the cylindrical portion of the collar body, progressively, an upper outer peripheral portion of the cylindrical portion is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, and a bottom outer peripheral portion of the cylindrical portion is provided with a bottom peripheral edge portion having the outer diameter smaller than the inner diameter of the introduction hole of the sub frame, and a tapered outer peripheral portion at the sub frame having the outer diameter portion, of which the diameter gradually grows from the bottom peripheral edge portion toward the collar root tip peripheral edge portion of the cylindrical portion, and whose outer diameter of the center section of the peripheral edge portion is larger than the inner diameter of the through-hole of the sub frame, and the collar is formed with a metal having the plasticity such as aluminum or a thermal refining material equal therewith, integrally.

According to the present invention, there is provided, a cylindrical portion of a collar body is provided with a introduction hole of the fastening bolt having an inner diameter larger than an outer diameter of the fastening bolt, a collar is provided to the bottom outer periphery of the cylindrical portion, progressively, an outer peripheral portion of the cylindrical portion is provided with an upper peripheral edge portion having the outer diameter smaller than the inner diameter of the through-hole of the sub frame, and a tapered outer peripheral portion having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the through-hole of the sub frame, and the collar is formed with a metal having the plasticity such as aluminum or a thermal refining material equal therewith, integrally.

The fastening due to the fastening bolt of the sub frame to the car body according to the present invention can be applied and executed immediately, and is extremely high in the mass-produced car of adaptability by preparing the sub frame rigid collar for car that provides with the cylindrical portion and the tapered outer peripheral portion used for the mass-produced car corresponding to bolt diameters etc. of 14 mm or 16 mm.

According to the fastening due to the fastening bolt of the sub frame to the car body of the present invention, the clearance between the car body, the sub frame, and the fastening bolt can be rapidly improved by the fastening fixation degree as in the welding manner, with the plasticity of the sub frame rigid collar for car, so that the resonance frequency of car body is set to desired value and can be improved, and thus the stability and quietness are improved, and then a soft riding comfort can be obtained.

BRIEF EXPLANATION OF THE DRAWINGS

FIG. 11 is an enlarged plan view showing the sub frame rigid collar for second car;

FIG. 12 is an enlarged bottom view showing the sub frame rigid collar for second car;

DETAILED DESCRIPTION OF THE INVENTION

Figure 1:
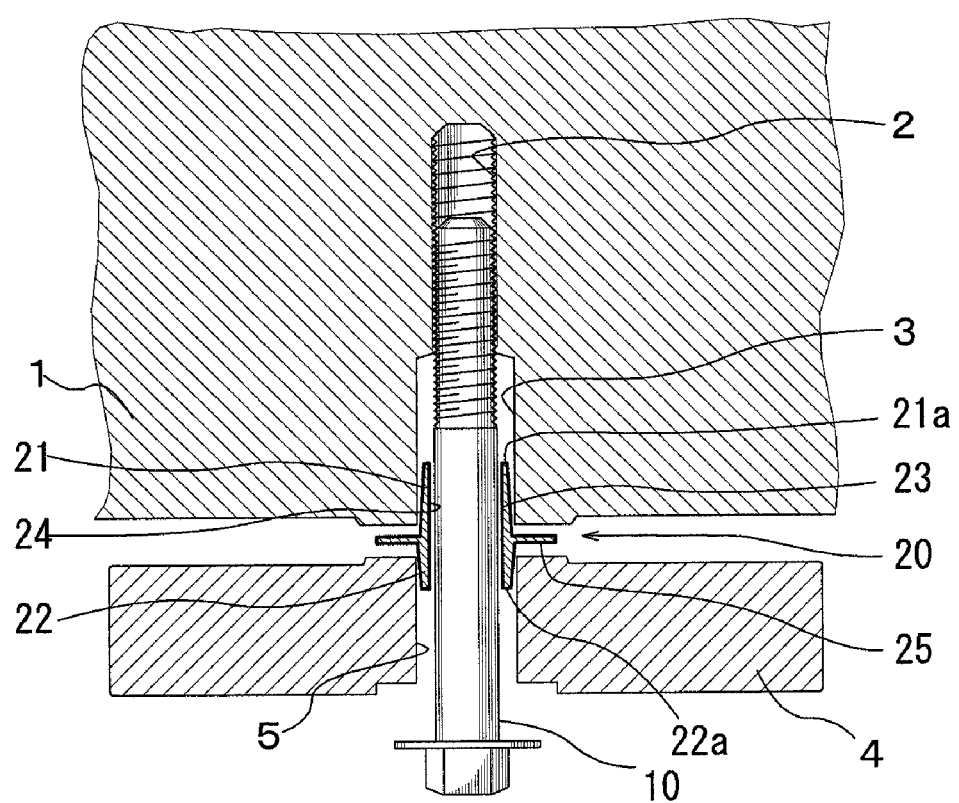
FIG. 1 is an longitudinal sectional view showing the setting state of a sub frame rigid collar for car in case of fastening the sub frame to the car body by a fastening bolt.

The fastening according to a fastening bolt of a sub frame to the car body of the present invention is achieved by the following method.

According to the present invention, there is provided a method of fastening a fastening bolt of a sub frame for a car body, in which a screw hole of the fastening bolt of the car body is provided with an introduction hole of the fastening bolt, the sub frame is provided with a through-hole of the fastening bolt, and the introduction hole and the through-hole are provided with a clearance for inserting the fastening bolt, respectively, characterized in that a cylindrical portion of a collar body is provided with a through-hole of the fastening bolt having a larger diameter than an outer diameter of the fastening bolt, a collar is provided to the outer periphery of the cylindrical portion of the collar body, progressively, an upper outer peripheral portion of the cylindrical portion is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, a bottom outer peripheral portion of the cylindrical portion is provided with a bottom peripheral edge portion having the outer diameter smaller than the inner diameter of the introduction hole of the sub frame, and a tapered outer peripheral portion at the sub frame having the outer diameter portion, of which the diameter gradually grows from the bottom peripheral edge portion toward the collar root tip peripheral edge portion of the cylindrical portion, and whose outer diameter of the center section of the peripheral edge portion is larger than the inner diameter of the through-hole of the sub frame, after the sub frame rigid collar for car integrally formed with a metal having the plasticity such as aluminum or the thermal refining material equal therewith, is inserted from the treaded portion side of the bolt through the fastening bolt through-hole of the said sub frame rigid collar for car, and interposed between the car body and the sub frame, the fastening bolt is fastened by a necessary torque while screwing the treaded portion of the fastening bolt in the screw hole of the car body, the tapered outer peripheral portion at the body side of the sub frame rigid collar for car and the tapered outer peripheral portion at the sub frame side are fastened, by compressing and force-fitting the outer diameter portions having its diameter larger than the inner diameters of the introduction hole and the through-hole of both tapered outer peripheral portions into respective introduction hole of the car body and through-hole of the sub frame while deforming the outer diameter portions of the car body and the sub frame with the plasticity of the sub frame rigid collar for car, thereby press-attaching and press-fitting the outer diameter portions between the inner peripheral surface of the introduction hole of the car body and the through hole of the sub frame and the outer peripheral surface of the fastening bolt, and by intervening and press-attaching the collar between the surface of portal edge portions of the introduction hole of the car body and of the through-hole of the sub frame.

In addition thereto, there is provided a method of fastening a fastening bolt of a sub frame for a car body, in which a screw hole of the fastening bolt of the car body is provided with an introduction hole of the fastening bolt, the sub frame is provided with a through-hole of the fastening bolt, and the introduction hole and the through-hole are provided with a clearance for inserting the fastening bolt, respectively, characterized in that a cylindrical portion of a collar body is provided with a introduction hole of the fastening bolt having an inner diameter larger than an outer diameter of the fastening bolt, a collar is provided to the bottom outer periphery of the cylindrical portion, progressively, an outer peripheral portion of the cylindrical portion is provided with an upper peripheral edge portion having the outer diameter smaller than the inner diameter of the through-hole of the sub frame, and a tapered outer peripheral portion having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the through-hole of the sub frame, the sub frame rigid collar for second car formed with a metal having the plasticity such as aluminum or a thermal refining material equal thereto, integrally is inserted from the treaded portion side of the bolt through the fastening bolt through-hole of the said sub frame rigid collar for car, and is interposed between the fastening bolt and the sub frame, a cylindrical portion of a collar body is provided with a through-hole of the fastening bolt having a larger diameter than an outer diameter of the fastening bolt, a collar is positioned at the center section of the collar body and provided to the outer periphery of the cylindrical portion, progressively, an upper outer peripheral portion of the cylindrical portion, is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, a bottom outer peripheral portion of the cylindrical portion is provided with a bottom peripheral edge portion having the outer diameter smaller than the inner diameter of the introduction hole of the sub frame, and a tapered outer peripheral portion at the sub frame having the outer diameter portion, of which the diameter gradually grows from the bottom peripheral edge portion toward the collar root tip peripheral edge portion of the cylindrical portion, and whose outer diameter of the center section of the peripheral edge portion is larger than the inner diameter of the through-hole of the sub frame, after the sub frame rigid collar for first car integrally formed with a metal having the plasticity such as aluminum or the thermal refining material equal thereto, is inserted from the treaded portion side of the bolt through the fastening bolt through-hole of the sub frame rigid collar for car, and is interposed between the car body and the sub frame, the fastening bolt is fastened by a necessary torque while screwing the treaded portion of the fastening bolt in the screw hole of the car body, the tapered outer peripheral portion of the sub frame rigid collar for second car is fastened into the through-hole of the sub frame, the tapered outer peripheral portion at the body side of the sub frame rigid collar for car of the sub frame rigid collar for first car and the tapered outer peripheral portion at the sub frame side, are fastened into respective introduction hole of the car body and through-hole of the sub frame, by compressing and force-fitting the outer diameter portions having its diameter larger than the inner diameters of the introduction hole and the through hole of respective tapered outer peripheral portions in respective introduction hole of the car body and through-hole of the sub frame while deforming the outer diameter portions of the car body and the sub frame with the plasticity of the sub frame rigid collar for first and second cars, thereby press-attaching and press-fitting the outer diameter portions between the inner peripheral surface of the introduction hole of the car body and the through hole of the sub frame and the outer peripheral surface of the fastening bolt, by intervening and press-attaching the collar of the sub frame rigid collar for second car between the surface of portal edge portions of the through-hole of the sub frame, and by intervening and press-attaching the collar of the sub frame rigid collar for first car between the surface of portal edge portions of the introduction hole of the car body and of the through-hole of the sub frame.

First Embodiment

Hereafter, an embodiment 1 of a method of fastening a fastening bolt of a sub frame to a car body according to the present invention is explained in detail with reference to FIGS. 1-7.

Figure 2:
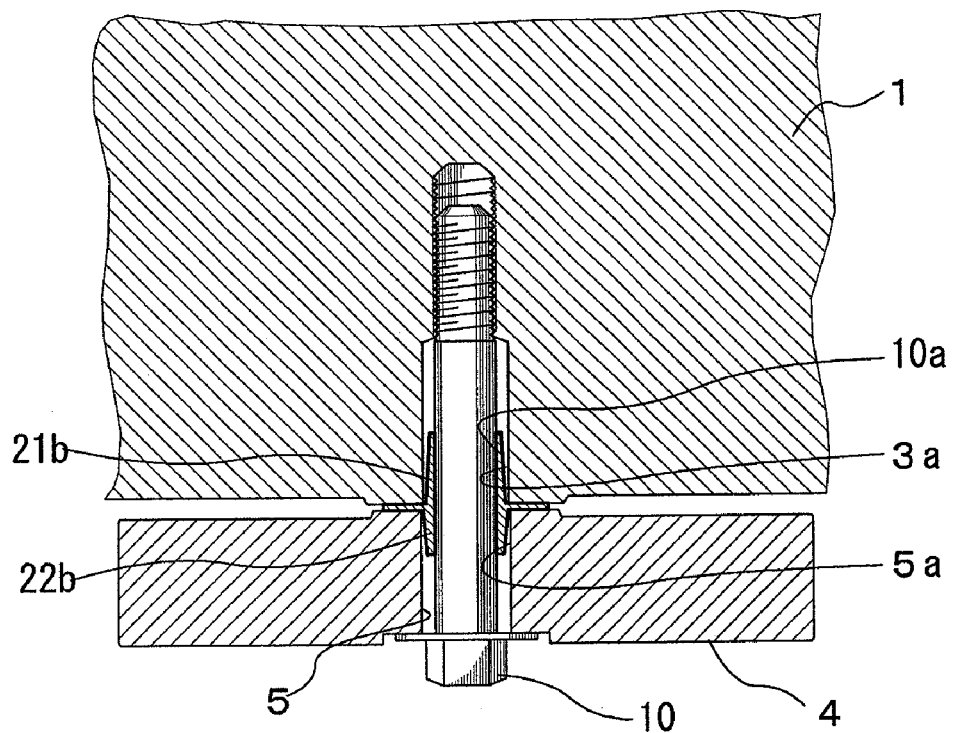
FIG. 2 is a longitudinal sectional view showing the fastening condition after fastened by a required necessary torque while screwing the treaded portion of the fastening bolt into the screw hole at the car body side.
Figure 3:
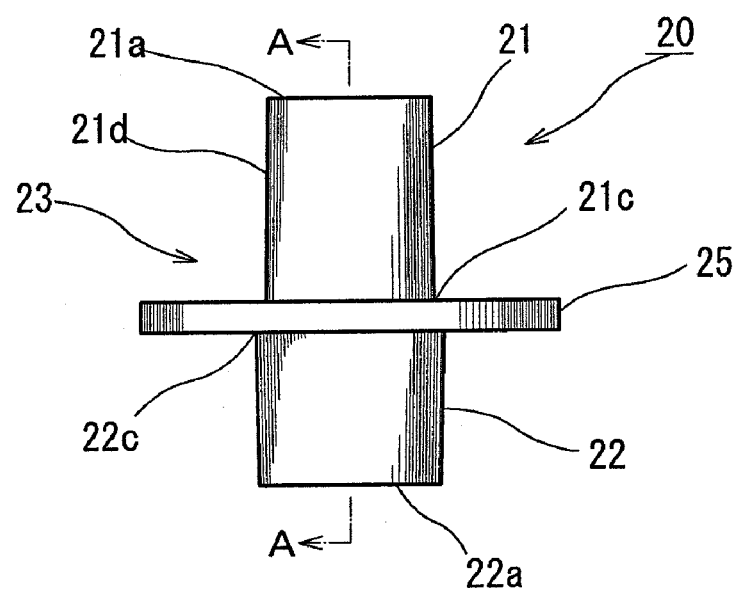
FIG. 3 is an enlarged front view showing a sub frame rigid collar for car for used in a fastening method.
Figure 4:
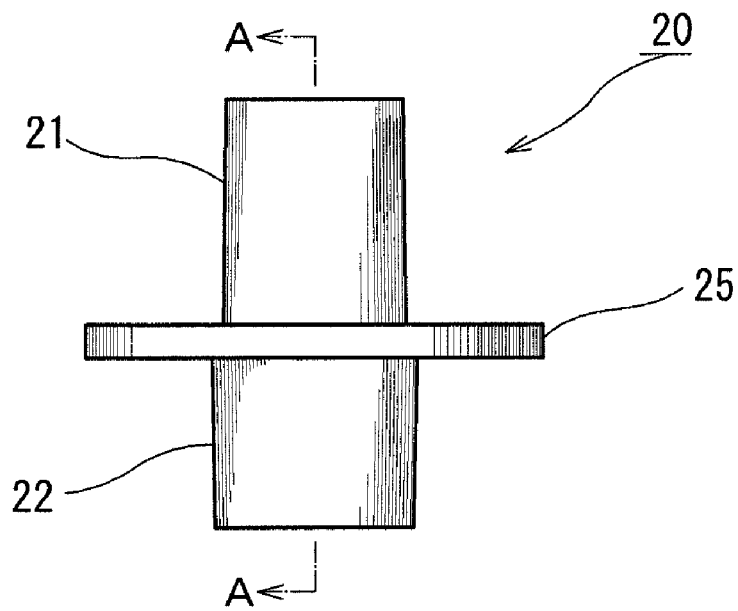
FIG. 4 is an enlarged side view showing a sub frame rigid collar for car for used in a fastening method.
Figure 5:
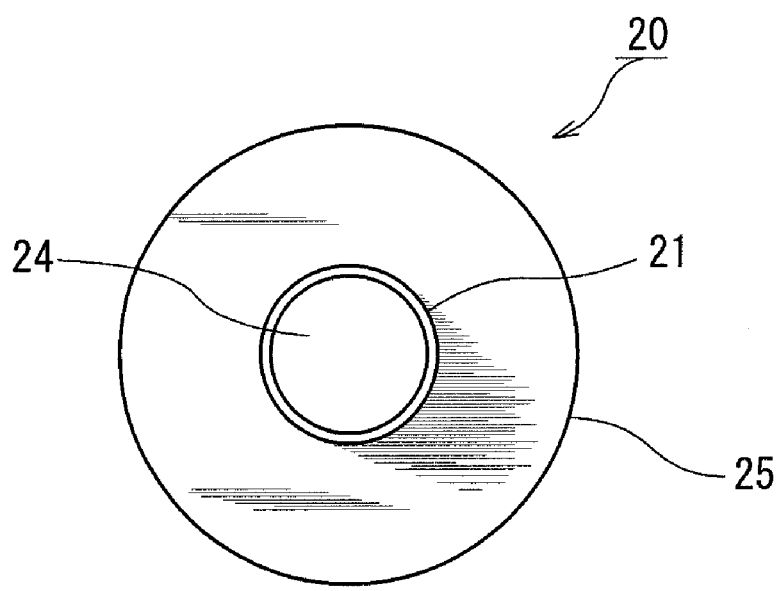
FIG. 5 is an enlarged plan view showing a sub frame rigid collar for car for used in a fastening method.
Figure 6:
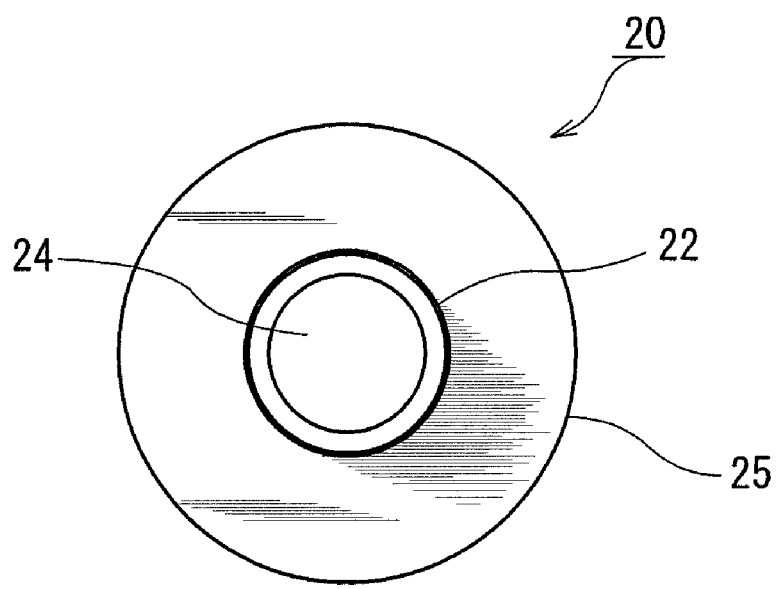
FIG. 6 is an enlarged bottom plan view showing a sub frame rigid collar for car for used in a fastening method.
Figure 7:
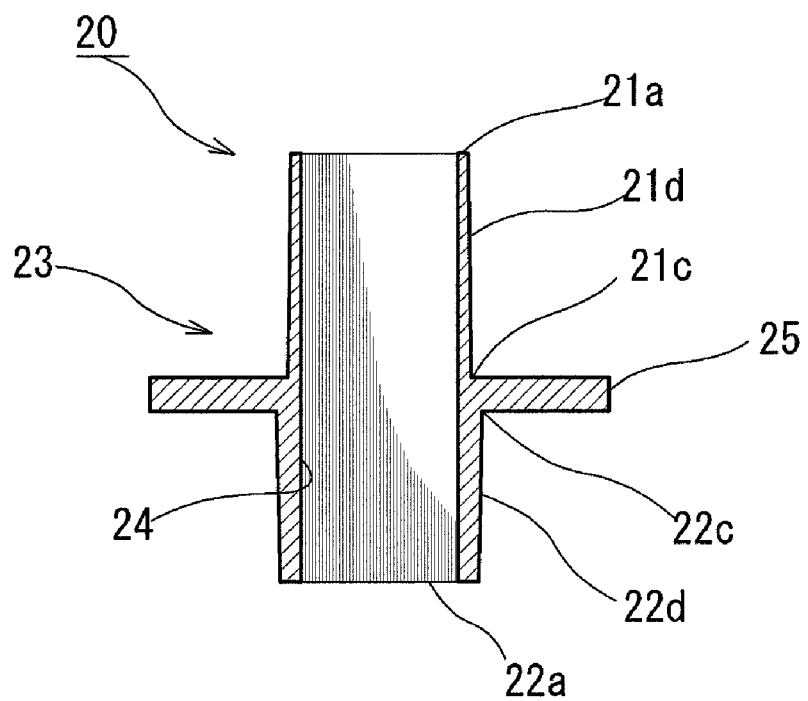
FIG. 7 is an enlarged sectional side view showing a sub frame rigid collar for car for used in a fastening method.

FIG. 1 is an longitudinal sectional view showing the setting state of a sub frame rigid collar for car in case of fastening the sub frame to a car body by a fastening bolt, FIG. 2 is a longitudinal sectional view showing the fastening condition after fastened by a required necessary torque while screwing the treaded portion of the fastening bolt into the screw hole at the car body side, FIGS. 3-7 are an expansion front view, an expansion side view, an enlarged plan view, an expansion bottom view, and an expansion side cross-sectional view of a sub frame rigid collar for car used for the present fastening method, respectively.

Figure 14:
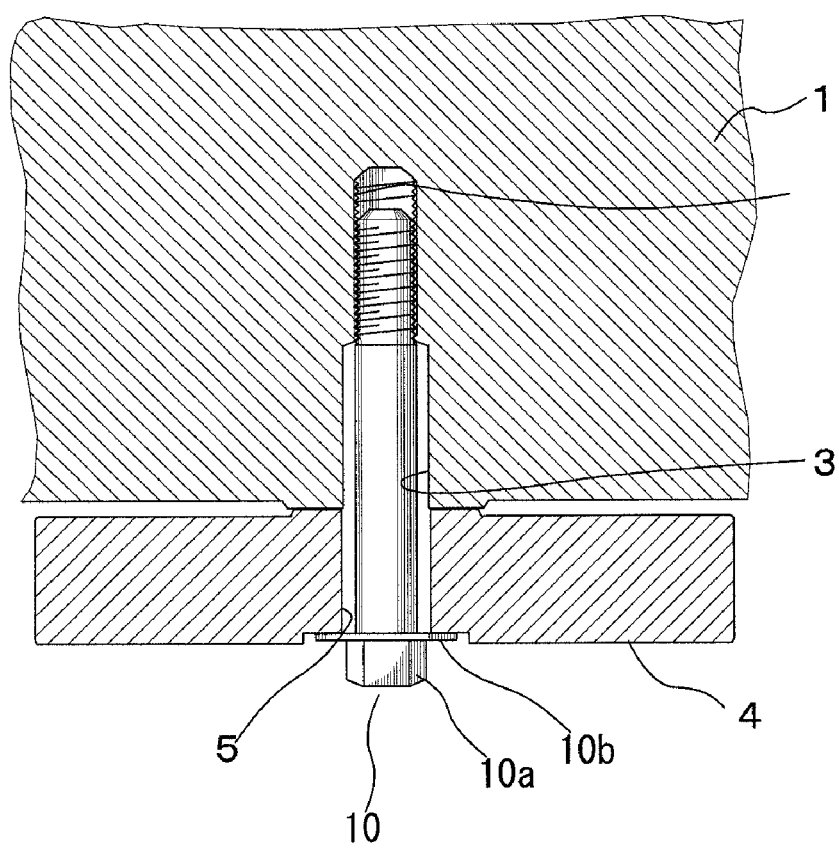
FIG. 14 is a longitudinal sectional view showing the conventional fastening condition.
Figure 15:
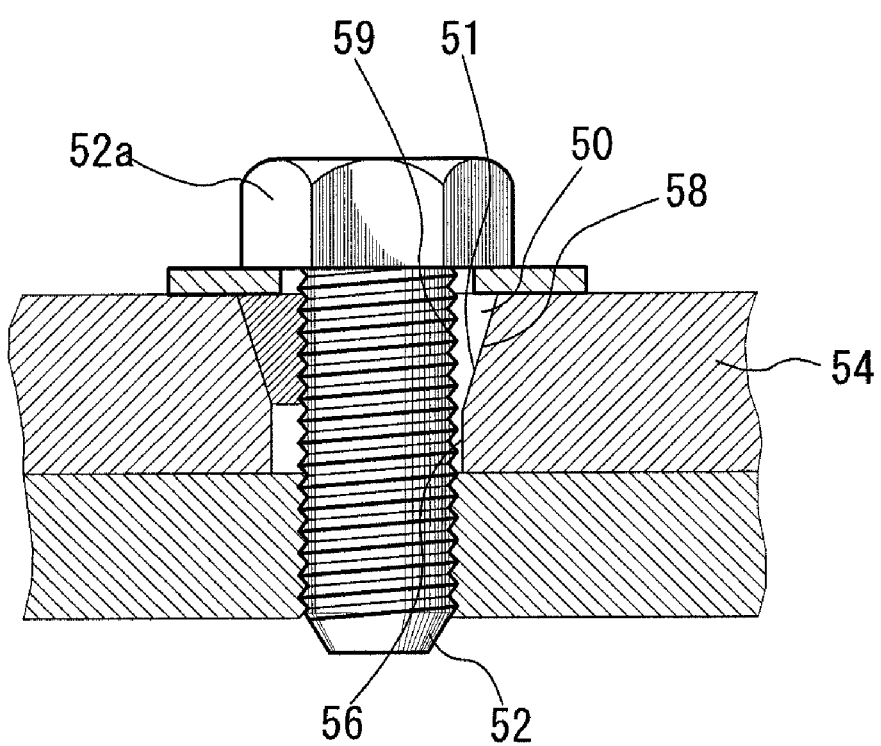
FIG. 15 is a cross-sectional view showing the fastening structure of the patent document 1.

Then, in order to execute the fastening method of the present invention as embodiment 1, as shown in FIG. 1, the fastening due to a fastening bolt 10 of a sub frame 4 to a monocoque body 1 being a car body, is as in the above-mentioned FIG. 14 being shown as a conventional fastening method.

That is, an introduction hole 3 of a diameter larger than the outer diameter of a fastening bolt 10 is pierced through the screw hole 2 of the monocoque body 1 and a through-hole 5 of the inner diameter slightly larger than the inner diameter of the introduction hole 3 is pierced through the sub frame 4.

Before the fastening condition, as shown in FIG. 1, a sub frame rigid collar for car 20 is set in the following state that a tapered outer peripheral portion 21 at the body side of the sub frame rigid collar for car 20 was charged into the introduction hole 3 of the monocoque body 1, and a tapered outer peripheral portion 22 at the sub frame side was charged into the through-hole 5 of the sub frame 4.

That is, the fastening bolt 10 is set in the following state that the tip side of a treaded portion 11 of the fastening bolt 10 is charged and screwed into the screw hole 2 of the monocoque body 1 through the through-hole 5 of sub frame 4, and then through a fastening bolt through-hole 24 of a cylindrical portion 23 being a collar body of the sub frame rigid collar for car 20.

Thereafter, the fastening bolt 10 in the state of FIG. 1 is fastened with the specified torque, the outer diameter portions having its diameter larger than the inner diameters of the introduction hole and the through-hole of both tapered outer peripheral portions are compressed and force-fitted into respective introduction hole of the car body and through-hole of the sub frame, while deforming the outer diameter portions of the car body and the sub frame with the plasticity of the sub frame rigid collar for car, the tapered outer peripheral portion 21 of the sub frame rigid collar for car 20 is compressed and press-fitted into the introduction hole 3, and the tapered outer peripheral portion 22 is compressed and press-fitted so as to deform the peripheral edge portion 21d and 22d having the diameter large than the inner diameter of the introduction hole 3 and the through-hole 5 of both tapered outer peripheral portions 21 and 22, by plasticity being as the property of the molding material of the sub frame rigid collar for car 20, and deformed portions 21b and 22b of the tapered outer peripheral portions 21 and 22 are press-attached and press-fit between inner periphery surfaces 3a and 5a of the introduction hole 3 and through-hole 5 and the outer peripheral surfaces 10a of the fastening bolts 10. (See FIG. 2)

Hereinafter, the sub frame rigid collar for car 20 is explained with reference to FIGS. 3-7.

As shown in FIGS. 3-7, the sub frame rigid collar for car 20 has a collar 25 provided on the outer periphery between the tapered outer peripheral portion 21 and 22 of the cylindrical portion 23 of the collar body, progressively.

Also, the tapered outer peripheral portion 21 at the body side is provided on the upper outer peripheral portion of the cylindrical portion 23, and has an upper peripheral edge portion 21a having the outer diameter smaller than the inner diameter of the introduction hole 3, the diameter of the upper outer peripheral portion gradually grows from the upper peripheral edge portion 21a toward the collar root tip peripheral edge portion 21c to the collar 25, and the diameter at collar root tip side of the peripheral edge portion 21d positioned at lower side from the nearly center of the tapered outer peripheral portion 21, is made larger than the inner diameter of the introduction hole 3.

Also, the tapered outer peripheral portion 22 at the sub frame side is provided on the bottom outer peripheral portion of the cylindrical portion 23, and has a bottom peripheral edge portion 22a having the outer diameter smaller than the inner diameter of the through-hole 5, the diameter of the bottom outer peripheral portion gradually grows from the bottom peripheral edge portion 22a toward the collar root tip peripheral edge portion 22c to the collar 25, and the diameter at collar root tip side of the peripheral edge portion 22d positioned at upper side from the nearly center of the tapered outer peripheral portion 22, is made larger than the inner diameter of the through-hole 5.

Therefore, the sub frame rigid collar for car 20 consisted of the above-mentioned constitution was integrally formed with the aluminum material, for example, pure aluminum 15S material.

However, as the aluminum material, the above pure aluminum 15S material, a duralumin system 54S material and an extra super duralumin system material can suitably applied, and metallic with the plasticity such as gunmetal and steel materials and other thermal refining materials equal therewith can be applied arbitrarily.

By the fastening due to the specified torque according to the embodiment 1 shown in FIGS. 1-7, it was proven that the resonance frequency of the body rise up by about 1 Hz, and the stability and quietness are improved, thereby obtaining, an ideal effect in soft ride quality with the wick.

Moreover, this was applied to the fastening part in four places of the one side of the body.

Also, when sub frame rigid collar for car 20 in above embodiment 1 is executed, for example, as 1-2 mm thickness of the tapered outer peripheral portion 22 inserted in the through-hole 5 of the sub frame 4, and as 1-2 mm thickness of tapered outer peripheral portion 21 inserted in the introduction hole 3 of the monocoque body 1, by the fastening of the above fastening bolt 10, tip parts of the plane tapered outer peripheral portions 21 and 22 (upper peripheral edge portion 21a and bottom peripheral edge portion 22a) progresses as it is in the opening portion of the introduction hole 3 and the through-hole 5, and then press-fits, while being gradually compressed from the part that exceeds the central portion of a taper large diameter portion, to the outer wall of both introduction hole 3 and through-hole 5 by the tightening torque, before long the tapered outer peripheral portions 21 and 22 stick completely.

Also, as for the fastening bolt 10 set by piercing through the cylindrical portion 23 of the sub frame rigid collar for car 20, the inner diameter of the cylindrical portion 23 is set more slight and more widely than the bolt outer diameter (0.1 mm for example), and the inside diameter of cylindrical portion 23 is compressed by the depression due to the above tightening torque, so that the clearance between the outer peripheries of the fastening bolt 10 that pierces through cylindrical portion 23 and is fastened, becomes none at all and sticks.

In addition, upper and lower sides of the collar 25 provided on the outer periphery between the tapered outer peripheral portions 21 and 22, progressively, are press-attached to the opening fringe planes of the through-hole 5 of the sub frame 4 and the introduction hole 3 of the monocoque body 1, respectively, and the distortion (parallelism of the plane) due to the spring back generated in the press forming step in the opening fringe plane of both introduction holes 3 and through-hole 5 can be corrected by the property of the plasticity of the collar 25, so that the distortion in this part can be absorbed and all degree of adhesions of this part can be improved.

Therefore, the outer wall of sub frame rigid collar for car 20 is displaced in response to the monocoque body 1 and the sub frame 4, the fastening bolt 10 in interior of the collar 25 is displaced, too, these displacements raise the fastening strength of the monocoque body 1 and the sub frame 4 due to the fastening bolt 10, and thus the full sticking effect with the contact surfaces of the monocoque body 1 side and the sub frame 4 side due to the operation of the above-mentioned collar 25 is effected by the constitution of the integrated collar 25 provided to the cylindrical portion 23 progressively. As is clear from the above-mentioned description, by the change in shape produced by the fastening step in the fastening portion of the monocoque body 1 and the sub frame 4 in the sub frame rigid collar for car 20, The triple fastening strength of the monocoque body 1, the sub frame 4 and the fastening bolt 10 rises up rapidly, and thus "the vertical spring rate goes up".

Therefore, it is achieved to raise "resonance frequency" and "resonance frequency property".

Though a described above description explained as to a concrete constitution in embodiment 1, the present invention is not limited thereto and various deforming and modifications may be performed to a kind, a design, and other special designs of the mass-produced car wheel, without departing from the spirit and scope thereof.

Second Embodiment

FIGS. 8-13 show a second embodiment of the present invention.

In the second embodiment, in order to improve the performance in the first embodiment further, the sub frame rigid collar 20 for car in this first embodiment is made to be a first sub frame rigid collar for car, and in addition thereto, the second sub frame rigid collar 30 for car is inserted and fastened between a pedestal portion 5b on the inserting side of the fastening bolt 10 of the through hole 5 of the sub frame 4 and the head 10a of the fastening bolt 10.

Figure 8:
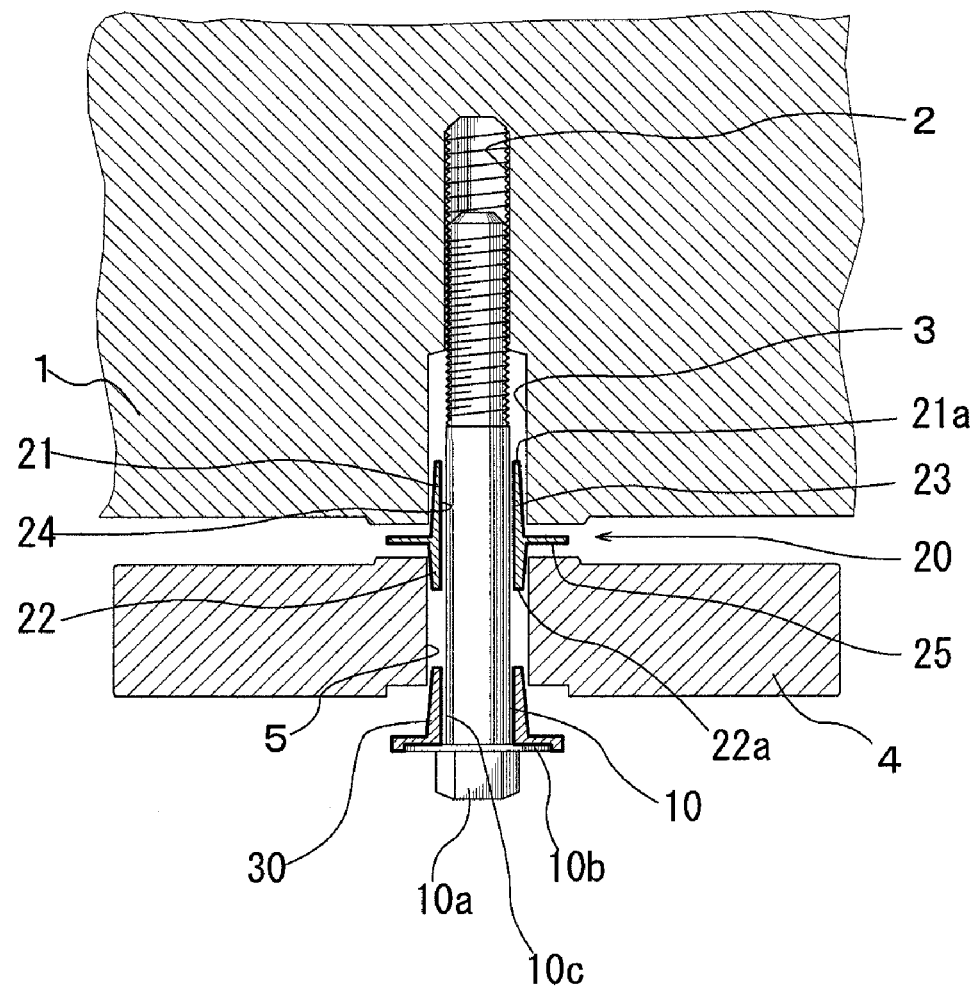
FIG. 8 is a longitudinal sectional view of a setting state showing the second embodiment.

That is, as shown in FIG. 8, in the setting condition in FIG. 1 of the first embodiment, after inserting the second sub frame rigid collar 30 for car on the head 10a of the fastening bolt 10 through a fastening bolt through-hole 32 provided to a cylindrical portion 31 of the second sub frame rigid collar 30 for car, the first sub frame rigid collar 20 for car shown in the setting condition of the first embodiment is set.

Figure 9:
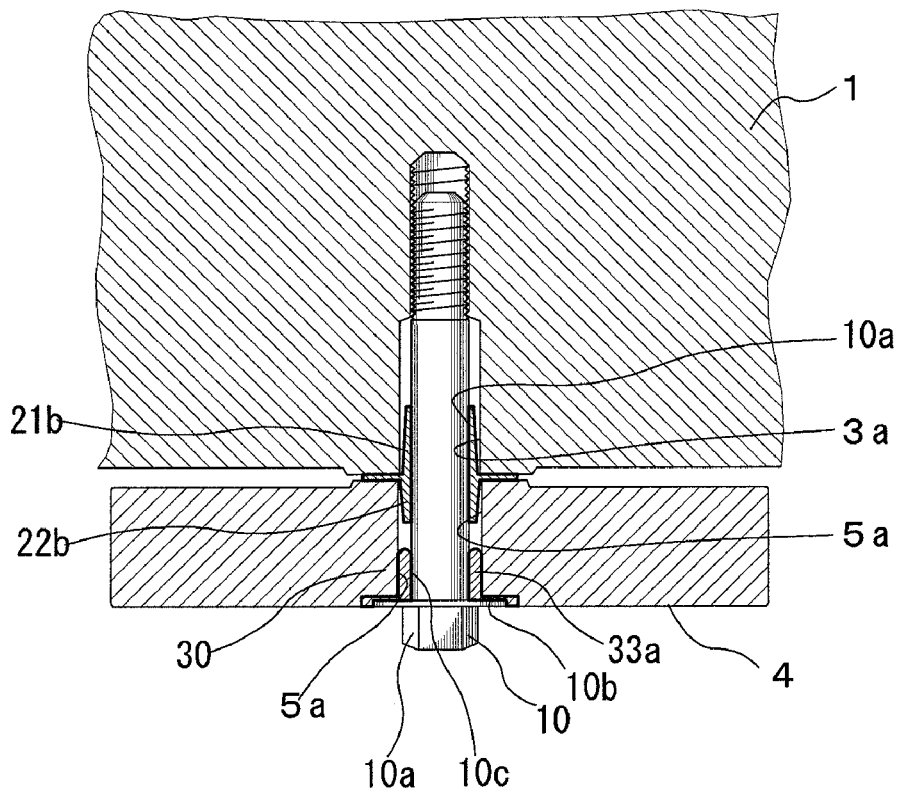
FIG. 9 is a longitudinal sectional view of a fastening state showing the second embodiment.
Figure 10:
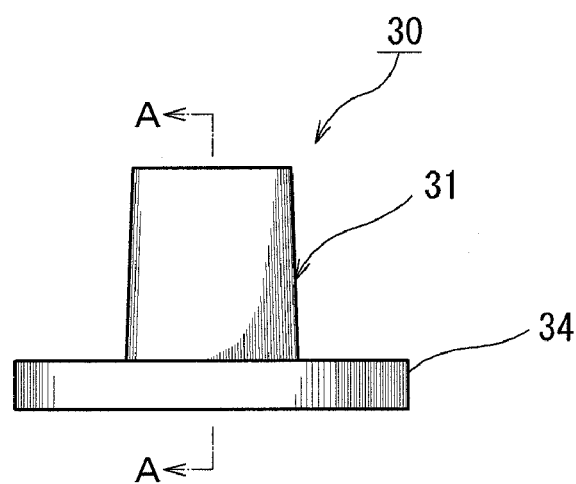
FIG. 10 is an enlarged front view showing the sub frame rigid collar for second car.
Figure 1:
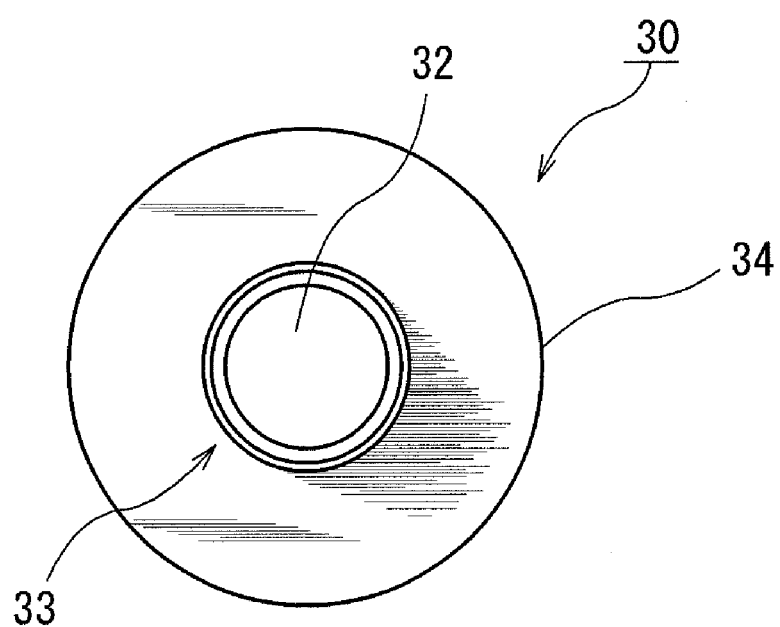
Figure 1:
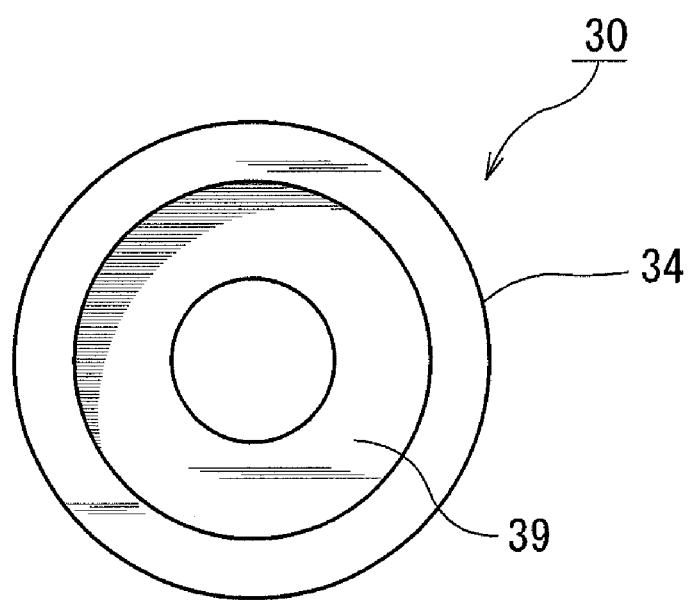

After setting condition of FIG. 8, as shown in FIG. 9, by executing the fastening of the fastening bolt 10 shown in the first embodiment, the sub frame rigid collar for first car 20 is mounted in such a manner that under the state similar to FIG. 2, the tapered outer peripheral portions 21 and 22 are deformed, press-fitted and press-attached, respectively, between the outer peripheral surfaces of the fastening bolt 10 and the introduction hole 3 and the through-hole 5.

At the same time, in the same way, a tapered outer peripheral portion 33 of the cylindrical portion 31 of the sub frame rigid collar for second car 30 is fastened in such a manner that the deformed portion 33a deformed by the plasticity, is press-fitted and is press-attached between the inner diameter inner periphery surface of the through hole 5 of the sub frame 4 and the outer peripheral surface of the head 10a of the fastening bolt 10.

As a result, the fastening condition between the head 10a side of the sub frame 4 and the fastening bolt 10 is made primitive and improved by the operation similar to the fastening effect according to the first sub frame rigid collar 10 for car, thereby producing a multiplier fastening and fixing effect with first sub frame rigid collar 20 for car.

Also, as shown in FIGS. 10-13, the sub frame rigid collar for second car 30 provides a through-hole 32 of the fastening bolt 10 having the inner diameter larger than the outer diameter of the fastening bolt 10, to a cylindrical portion 31 of the collar body, and a collar 34 is provided to the bottom outer periphery of the cylindrical portion 31, progressively, an outer peripheral portion of the cylindrical portion 31 is provided with an upper peripheral edge portion 36 having the outer diameter smaller than the inner diameter of the through-hole 5 of the sub frame 4, and a tapered outer peripheral portion 33 having the outer diameter portion, of which the diameter gradually grows from the upper peripheral edge portion 36 toward the collar root tip peripheral edge portion 37 of the cylindrical portion 31 to the collar 34, and whose outer diameter of the center section 38 of the peripheral edge portion is larger than the inner diameter of the through-hole 5 of the sub frame 4, this was formed integrally with a same material as the sub frame rigid collar for first car 20.

Figure 13:
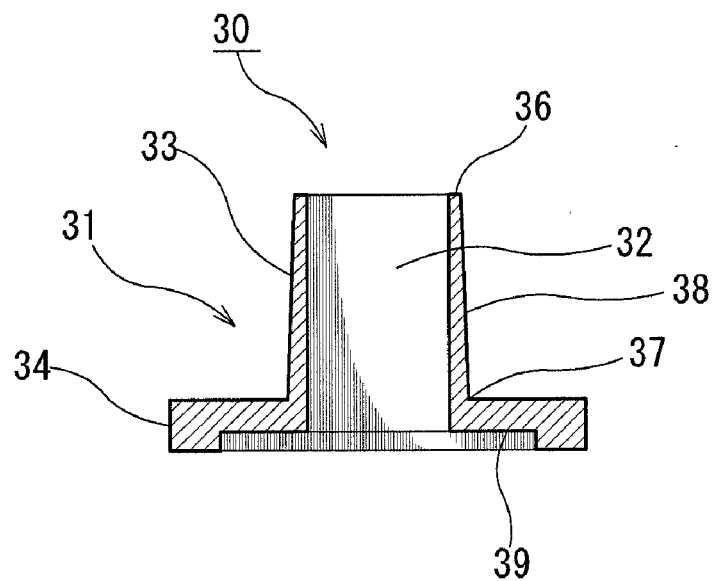
FIG. 13 is an enlarged sectional side view showing the sub frame rigid collar for second car.

Moreover, as shown in FIGS. 12 and 13, the bottom of the collar 34 is provided with a recess portion 39 for fitting of the flange 10b which is provided to the head 10a of the fastening bolt 10 in a protruding condition.

Moreover, as described in the first embodiment, though this embodiment can be executed by using a metal having plasticity other than the aluminum material or other thermal refining material equal thereto, and The execution is not limited to the case of using the sub frame rigid collars for first and second car 20 and 30 with the same material.

In the second embodiment as well as the first embodiment, the tapered outer peripheral portions 21 and 22 of the sub frame rigid collar for first cars 20 are transformed while gradually crashing by the plasticity between the outer peripheral surfaces of the fastening bolt 10 and the inner periphery surface of the introduction hole 3 and the through-hole 5, and enters the state of the press fitting and sticking to crush the clearance between the inner periphery surface and the outer peripheral surface by fastening with the specified torque of fastening bolt 10 or other required torques.

In that case, the internal pressure between the sub frame rigid collar for car 20 and the fastening bolt 10 rises, and the monocoque body 1 and the sub frame 4 can almost obtain a fastening fixing level near the rigid state by the multiplier effect.

And then, the fastening fixing level with high precision can be ensured by a joint multiplier effect with the second sub frame rigid collar for car 30.

Moreover, the following points can be nominated as a function-effect according to first and second embodiments of the present invention.

(a) Twist strength of the body rises, and maneuverability improves.
(b) The vertical spring rate rises, and the soft riding comfort can be obtained.
(c) Quietness improves.
(d) The positioning does not shift even if the sub frame is detached by the clutch exchange etc, and the boundary alignment deviation can be prevented.
(e) The body rigidity and strength rise, as a result, the improvement of the collision safety can be obtained.
(f) The abrasion resistance of the tire improves.
(g) In addition, as an economical effect, if necessary, as to the sub frame rigid collar for car used for the fastening method of the present invention, the reuse is possible.

What is claimed is:

1. A method of fastening a fastening bolt of a sub frame for a car body, comprising providing a screw hole in the car body with an introduction hole for the fastening bolt, providing the sub frame with a through-hole for the fastening bolt, and providing the introduction hole and the through-hole with respective clearances for inserting the fastening bolt, wherein a cylindrical portion of a collar body is provided with a through-hole of the fastening bolt having a larger diameter than an outer diameter of the fastening bolt, a collar is provided to the outer periphery of the cylindrical portion of the collar body, progressively, an upper outer peripheral portion of the cylindrical portion is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, a lower outer peripheral portion of the cylindrical portion is provided with a bottom peripheral edge portion having an outer diameter smaller than the inner diameter of the through-hole of the sub frame, and a tapered outer peripheral portion at the sub frame side having the outer diameter portion, of which the diameter gradually grows from the bottom peripheral edge portion toward the above collar root tip peripheral edge portion of an above cylindrical portion, and whose outer diameter of the center section of the peripheral edge portion is larger than the inner diameter of the through-hole of the sub frame, after the sub frame rigid collar for car integrally formed with aluminum or a thermal refining material equal therewith, is inserted from the treaded portion side of the bolt through the fastening bolt through-hole of the said sub frame rigid collar for car, and interposed between the car body and the sub frame, the fastening bolt is fastened by a necessary torque while screwing the treaded portion of the fastening bolt in the screw hole of the car body, the tapered outer peripheral portion at the body side of the sub frame rigid collar for car and the tapered outer peripheral portion at the sub frame side are fastened, by compressing and force-fitting the outer diameter portions having its diameter larger than the inner diameters of the introduction hole and the through hole of both tapered outer peripheral portions into respective introduction hole of the car body and through-hole of the sub frame while deforming the outer diameter portions of the car body and the sub frame with the plasticity of the sub frame rigid collar for car, thereby, press-attaching and press-fitting the outer diameter portions between the inner peripheral surface of the introduction hole of the car body and the through hole of the sub frame and the outer peripheral surface of the fastening bolt, and by intervening and press-attaching the collar between the surface of portal edge portions of introduction hole of the car body and of the through-hole of the sub frame.

2. A method of fastening a fastening bolt of a sub frame for a car body, comprising providing a screw hole in the car body for the fastening bolt with an introduction hole for the fastening bolt, providing the sub frame with a through-hole for the fastening bolt, and providing the introduction hole and the through-hole respective clearances for inserting the fastening bolt, wherein a cylindrical portion of a collar body of a sub frame rigid collar is provided with a through-hole for the fastening bolt having an inner diameter larger than an outer diameter of the fastening bolt, a collar portion of the sub frame rigid collar is provided to the bottom outer periphery of the cylindrical portion, progressively, an outer peripheral portion of the cylindrical portion is provided with an upper peripheral edge portion having the outer diameter smaller than the inner diameter of the through-hole of the sub frame, and a tapered outer peripheral portion having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the through-hole of the sub frame, the sub frame rigid collar for second car formed with aluminum or a thermal refining material equal thereto, integrally is inserted from the threaded portion of the bolt through the fastening bolt through-hole of the said sub frame rigid collar for car, and is interposed between the fastening bolt and the sub frame, a cylindrical portion of a collar body is provided with a through-hole of the fastening bolt having a larger diameter than an outer diameter of the fastening bolt, the collar is positioned at the center section of the collar body and provided to the outer periphery of the cylindrical portion, progressively, an upper outer peripheral portion of the cylindrical portion, is provided with an upper peripheral edge portion having the outer diameter smaller than the inner diameter of the introduction hole of the car body, and a tapered outer peripheral portion at the body side having the outer diameter portion, of which the diameter gradually grows from the upper peripheral edge portion toward the collar root tip peripheral edge portion of the cylindrical portion, and whose outer diameter of the center section of the peripheral edge portion is larger than the inner diameter of the introduction hole of the car body, an upper outer peripheral portion of the cylindrical portion is provided with an bottom peripheral edge portion having the outer diameter smaller than the inner diameter of the through-hole of the sub frame, and a tapered outer peripheral portion at the sub frame side having the outer diameter portion, of which the diameter gradually grows from the bottom peripheral edge portion toward the collar root tip peripheral edge portion of the cylindrical portion, and whose outer diameter of the center section of the outer peripheral edge portion is larger than the inner diameter of the through-hole of the sub frame, after the sub frame rigid collar for first car integrally formed with a metal having the plasticity such as aluminum or the thermal refining material equal thereto, is inserted from the threaded portion of the bolt through the fastening bolt through-hole of the sub frame rigid collar for car, and is interposed between the car body and the sub frame, the fastening bolt is fastened by a necessary torque while screwing the threaded portion of the fastening bolt in the screw hole of the car body, the tapered outer peripheral portion of the sub frame rigid collar for second car is fastened into the through-hole of the sub frame, the tapered outer peripheral portion at the body side of the sub frame rigid collar for car of the sub frame rigid collar for first car and the tapered outer peripheral portion at the sub frame side, are fastened into respective introduction hole of the car body and through-hole of the sub frame, by compressing and force-fitting the outer diameter portions having its diameter larger than the inner diameters of the introduction hole and the through hole of respective tapered outer peripheral portions in respective introduction hole of the car body and through-hole of the sub frame while deforming the outer diameter portions of the car body and the sub frame with the plasticity of the sub frame rigid collar for first and second cars, thereby press-attaching and press-fitting the outer diameter portions between the inner peripheral surfaces of the introduction hole of the car body and the through hole of the sub frame and the outer peripheral surface of the fastening bolt, by intervening and press-attaching the collar of the sub frame rigid collar for second car between the surface of portal edge portions of the through-hole of the sub frame, and by intervening and press-attaching the collar of the sub frame rigid collar for first car between the surface of portal edge portions of the introduction hole of the car body and of the through-hole of the sub frame.

* * * * *